June 19, 1956  B. VER NOOY  2,750,612
WEAR-COMPENSATING PIPE LINE SCRAPER
Filed Nov. 13, 1952
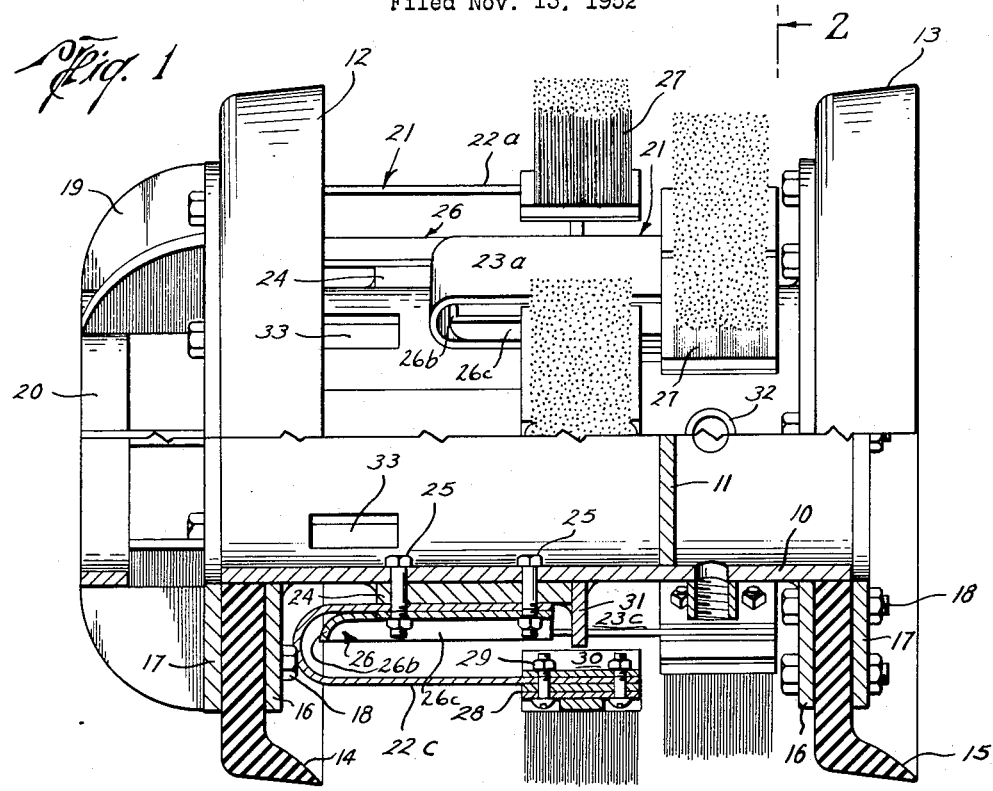
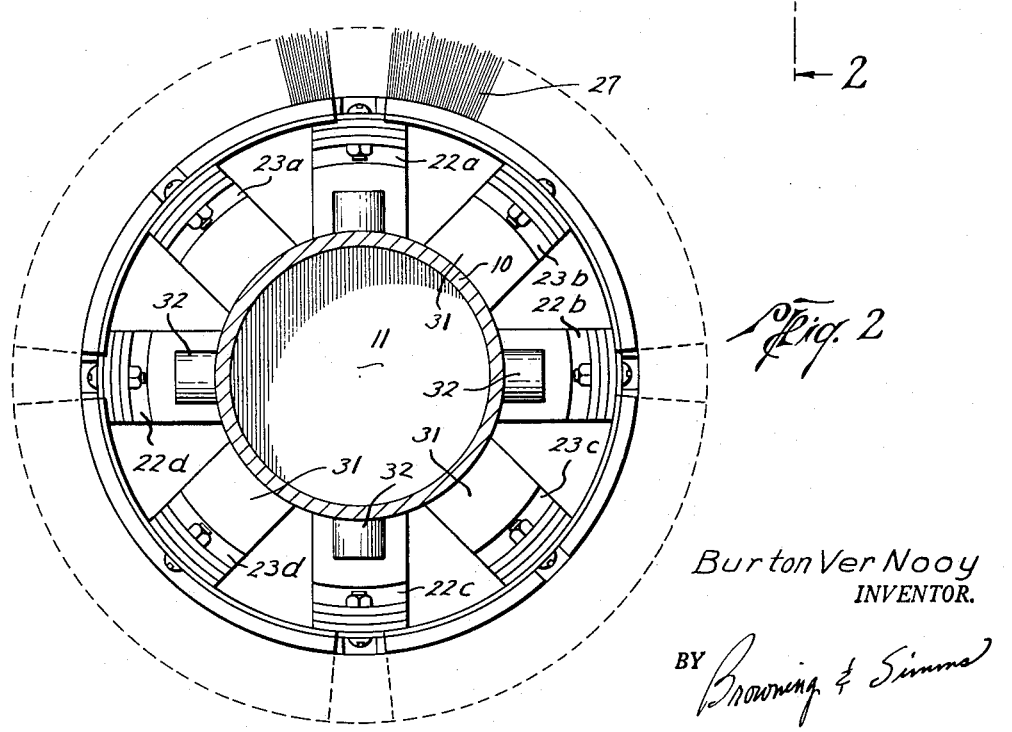
Burton Ver Nooy
INVENTOR.
BY Browning & Simms
ATTORNEYS United States Patent Office 2,750,612
Patented June 19, 1956

2,750,612

WEAR-COMPENSATING PIPE LINE SCRAPER

Burton Ver Nooy, Tulsa, Okla., assignor to T. D. Williamson, Inc., Tulsa, Okla., a corporation of Oklahoma Application November 13, 1952, Serial No. 320,286

2 Claims. (Cl. 15—104.06)

This invention relates to a wear-compensating pipe line scraper which is particularly adapted to negotiate relatively short radius bends in pipe and yet to provide full wear-compensating coverage on the internal circumference of such pipe.

Many pipe lines are constructed with relatively short radius bends therein. This is particularly true of natural gas pipe lines in which welding L's are frequently used. Also, even where weld L's are not employed, pipe lines often have sharp curves therein. Further, in many pipe lines, the radius of curvature of the curves is based upon the diameter of the pipe so that the curves are bent on a radius equal to a predetermined multiple of the pipe diameter. For the big inch pipe lines, such as a 30 inch, the curves would be quite gradual and it is possible to use therein a rather long scraper without having it either hang up in the curve, or more likely, to improperly scrape the pipe at the curve. However, as the size of the pipe decreases, so does the radius of curvature and it is desirable to employ a shorter scraper than in the larger pipe sizes. As the length of the scraper decreases, it becomes increasingly difficult to provide one which will not only scrape the entire inner surface of the pipe at the curve, but which will also be wear-compensating so that as the scraper elements wear, they will be moved outwardly so as to exert a constant pressure on the pipe being scraped. Prior to this invention, a scraper which can traverse relatively short radius bends, such as welding L's, and yet provide full wear-compensating coverage has not been successfully produced and it is an object of this invention to provide such a scraper.

Another object of this invention is to provide a pipe line scraper which is self-compensating for wear of its scraper elements and which is relatively light in weight so that wear on the scraper elements is at a minimum.

Another object of this invention is to provide a pipe line scraper which is particularly adapted to pass through sections of pipe curved on a relatively short radius and yet to provide full scraping coverage around the inner circumference of the pipe.

Another object of this invention is to provide a pipe line scraper which is particularly adapted to not only give full scraping coverage around the inner circumference of a pipe but also to compensate for scraper wear in such fashion that the scraper elements will always exert a positive pressure on the surface being scraped, even when the scraper elements become worn.

Another object of this invention is to provide a pipe line scraper which will negotiate a relatively short radius bend in a pipe, such as welding L's, and yet will scrape the entire inner periphery of the pipe even though there is a substantial change in the internal diameter of the pipe or even though the pipe is substantially out-of-round.

Another object is to provide a scraper wherein a plurality of scraper or cleaning elements, such as brushes, are mounted upon one leg of U-shaped spring elements, such leg being sufficiently long that limited radial movement of the cleaning elements will not cause their faces to be appreciably cocked with respect to the pipe surface being scraped.

Another object of this invention is to provide means in such a scraper for permitting fluid to circulate around the cleaning elements or brushes so as to remove debris therefrom.

Another object of this invention is to provide a pipe line scraper in which at least circumferential rows of brushes are situated one immediately behind the other with the brushes in one row overlapping the path of travel of the brushes in the other row, the brushes being so mounted that limited radial movement thereof will not appreciably change the angular relationship between their faces and that of a pipe surface.

Other objects, advantages and features of this invention will be apparent to one skilled in the art upon a consideration of the written specification, the appended claims and the attached drawings wherein:

Fig. 1 is a side elevational view, partially in cross-section, of a preferred embodiment of the pipe line scraper of this invention; and Fig. 2 is a view taken on the line 2—2 of Fig. 1.

Like characters of reference are used throughout both views to designate like parts.

Referring to the drawings, there is shown a central body 10, preferably a hollow or tubular member, such as a length of pipe, in order to be of minimum weight. When a pipe section is used, a partition 11 is provided across the bore to prevent fluid from by-passing through the scraper. In the most preferred form of this invention, the central body is of minimum length consistent with its functions so that the scraper can successfully traverse relatively short radius bends in pipe. The arrangement of parts permitting this minimum length is described below in detail.

A cup 12, and preferably at least one other cup 13 is carried by central body 10 to extend transversely thereof. As illustrated in the drawings, cups 12 and 13 are situated at the extremities of body 10 and are provided with flexible lips 14 and 15, respectively, which are adapted to form a sliding seal with a pipe into which the scraper is to be inserted. Cups 12 and 13 are preferably formed of a rubber which is resistant to the fluid with which the scraper is to come into contact while scraping the pipe line. When scraping petroleum pipe lines, neoprene is a preferred material. It will be noted that the sealing lips 14 and 15 both extend in a direction which is opposite to that which the scraper moves through the pipe line. It will be understood that the outside diameter of the cups is such that upon insertion of the scraper into the pipe line to be scraped, there will be a limited radial compression of the cups to form a sliding seal with the inner surface of the pipe. It should be noted that while cups as described are preferred, discs of rubber, neoprene, belting or the like can be used in place of the illustrated cups or in conjunction therewith.

Each cup is fastened to the central body as, for example, by mounting between a radially extending flange 16 connected to body 10 and an opposing flange 17. These flanges are drawn together to compress a portion of the cups by a plurality of bolts 18.

The forward flange 17 carries a plurality of radially extending gusset plates 19 which have an annular member 20 connected to their inner edges. This assembly, commonly termed a "nose piece," is provided to act as a "bumper" to stop the scraper in the event an obstruction in the pipe line is encountered.

A plurality of scraper assemblies, designated generally by the numeral 21, are provided and, broadly, each of these assemblies comprises a U-shaped spring element and a scraper or cleaning element such as a wire brush or the like. As illustrated in the drawings, the scraper assemblies are disposed in the space externally of body 10 and intermediate cups 12 and 13. The scraper assemblies are divided into groups, such groups being longitudinally spaced apart along the body 10; a scraper having two such groups being illustrated in the drawings. The scraper assemblies within each group are spaced circumferentially around the periphery of body 10.

Thus, as shown in the drawings, spring elements 22a through 22d of the forward group are spaced 90° apart whereas spring elements 23a through 23d of the rear group, while also spaced 90° apart, are staggered alternately with the springs of the forward group by being displaced circumferentially 45° therefrom. In this manner, the springs 23a through 23d have forward ends extending into the spaces between the springs 22a through 22d.

Each of the spring elements is connected to body 10 by one of its legs as by being bolted to a mounting block 24, the mounting blocks being attached to body 10. Bolts 25 extending through body 10 and the mounting block secure the springs to the scraper body with the length of the springs paralleling the longitudinal axis of body 10. A back up 26 having a curved body portion 26b and stiffening ribs 26c can be provided internally of the springs for a purpose which will be described below. It will be noted that this back up is bolted down by the bolts 25 and has its curved body portion extending toward the inside of the curved portion of the U-shaped spring but spaced therefrom so as to not interfere with the action of the U-shaped spring when the latter is in the position shown in the drawings.

Each of the springs 22a through 22d and 23a through 23d carries a cleaning element illustrated as a brush 27 near the extremity of its unattached leg, that is, the leg paralleling the one connected to body 10. The bristles of each of the brushes extend outwardly from a brush holder 28 which is bolted to the leg of a spring by bolts 29. A spring liner 30 is provided. It will be noted that a stop 31 is provided under each brush to limit the distance which the brush can be pushed inwardly toward body 10.

In a more preferred form the leg of the U-shaped spring to which the brush is attached has a length which is a substantial portion of the length of body 10 and is sufficiently long so that upon limited movement of the cleaning elements toward and away from body 10, the faces of such elements which normally contact the pipe to be scraped will not have their angular relationship with the longitudinal axis of body 10 changed to a substantial degree. With this construction, should there be encountered a flat spot in a pipe or even a smaller diameter pipe, the cleaning elements can move inwardly a limited distance without cocking their faces from the pipe surface. If the faces were cocked sufficiently, the portion of the cleaning element near one edge of such element's scraping face would be pressed to an excessive extent against the pipe surface while the portion of the cleaning element near the opposite edge of the scraping face would contact such surface only lightly or even not at all. If this condition were substantially avoided, the entire scraping face, e. g. the ends of all of the bristles when a brush is used, would be permitted to contact the pipe surface with substantially the same force, thereby not only increasing the scraping efficiency of the cleaning elements but also making wear on the scraping face uniform throughout. With the construction above described, it will be seen that when the cleaning elements move radially outwardly, for example, there will be a very slight cocking, in theory, of the scraping faces, but this is at a minimum due to the long lever arm provided in the form of one leg of the U-shaped spring.

From the foregoing, it will be seen that staggering the individual spring elements of the groups of scraper assemblies and the extension of the spring elements of a succeeding group into the spaces between the spring elements of a preceding group permits the usage of relatively long U-shaped springs and yet permits a very compact scraper. The length of the legs of the U-shaped springs upon which the cleaning elements or brushes are mounted should be a maximum consistent with the desired length of the scraper body in order to eliminate cocking of the scraping faces as much as possible.

As the scraper proceeds through a pipe line, scrapings, such as dislodged rust, paraffin, and various other depositions, will accumulate in the space between the cups and externally of the scraper body. The scraper of this invention may run for many, many miles before it is removed from the pipe line and, during such a run, hundreds of pounds of scrapings may be dislodged. To remove at least some of these scrapings from the vicinity of the cleaning elements, a fluid by-pass is arranged so that a portion of the fluid in the pipe line can flow past the cleaning elements to sweep scrapings from the scraper. Thus, a fluid inlet passage is provided between the rear end of the scraper and the space wherein the cleaning elements are situated by means of a plurality of couplings 32. These couplings provide communication between the interior of body 10 upstream of partition 11 and the space exterior of the body and can be fitted with plugs when by-pass flow is not desired through any or all of the couplings. A fluid outlet passage in the form of openings 33 provides communication between the space exterior of the scraper body and its downstream end. It will be noted that couplings 32 and openings 33 are spaced longitudinally apart so that fluid flow will have a sweep through substantially all of the space occupied by the cleaning elements.

In the generally preferred form of this invention, brushes substantially similar to those shown in the drawings are employed. Wire brushes present, for any given size, a much greater cutting edge than do other types of cleaning elements such as cup-type round wire brushes, steel plows, steel blades and the like. However, such other types of cleaning elements can be used in this invention as desired. Still another type of cleaning element than those mentioned above is formed of a block of polishing material such as compressed lathe turnings, steel wool, random wires or metal or mineral abrasives embedded in plastic or rubber. It may be that certain cleaning elements will have particular advantages over others for any given type of situation and hence can readily be used but, for general scraping action, the wire brushes are preferred.

When brushes 27 are used, they preferably have arcuately shaped faces in lateral cross-section so that the faces conform generally to the periphery of the pipe to be scraped. The lateral or circumferential width of the brushes is sufficient that a brush in one group overlaps the path of travel of both of the two most adjacent brushes in another group. As illustrated most clearly in Fig. 2, the arcuate face of each brush encompasses almost ninety degrees and there is only a slight gap between adjacent brushes of the same group. This gap is sufficiently wide that the ends of adjacent brushes do not interfere with each other as the brushes move toward the scraper body. Since the brushes of the two groups of scraper assemblies are staggered with each other, it is apparent that full and complete scraping coverage is provided around the entire periphery of the pipe being scraped. Further, as the scraper traverses a short radius bend, it will be apparent that the longitudinal axis of the scraper may not then be coincident with the axis of the pipe being scraped. Nevertheless, the brushes at the outside of the bend can move away from the scraper body to exert a constant pressure on the pipe surface while the brushes on the inside of the bend can move toward the scraper body; all without leaving any area in the bend out of scraping contact with a brush. In this manner, full scraper coverage is provided even in short radius bends, such as welding L's.

As described above, back up 26 can be provided. It lies inside the U-shaped portion of the spring elements so that the curved portion 26b of the back up will limit the degree of rolling which the springs can have at their U-bend due to the scraping force on the brushes tending to move the latter to the rear of the scraper. The back ups are therefore useful in preventing excess forces tending to pull the brushes rearward from permanently deforming, or even breaking, the U-shaped springs and yet they do not interfere with outward or inward movement of the brushes.

From the foregoing, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pipe line scraper which comprises, in combination, a body adapted to be disposed centrally within a pipe line, a plurality of reverse bend springs carried by said body at spaced points circumferentially thereof, one leg of each of said springs being attached to said body and the other leg thereof extending rearwardly of the body, a cleaning element mounted on said other leg in position to engage the pipe line, and a reinforcing member disposed between the legs of each spring and attached to the body, said member having a portion curved to substantial conformity with an slightly spaced from the bend of the spring in an unstressed condition of said spring.

2. A pipe line scraper which comprises, in combination, a body adapted to be disposed centrally within a pipe line, a plurality of U-shaped springs carried by said body at spaced points circumferentially thereof, one leg of each spring being attached to the body along a length thereof substantially parallel to the longitudinal axis of said body, a reinforcing member disposed between the legs of each spring and attached to the first-mentioned leg, said member having a portion curved to substantial conformity with and slightly spaced from the U of the spring in an unstressed condition of the spring, and a cleaning element mounted on the second-mentioned leg of each spring in position to engage the pipe line.

References Cited in the file of this patent

UNITED STATES PATENTS

| | | |
|---|---|---|
| 953,666 | Inglee | Mar. 29, 1910 |
| 1,436,784 | Spillane | Nov. 28, 1922 |
| 1,826,942 | Mackres | Oct. 13, 1931 |
| 1,930,571 | Traxl | Oct. 17, 1933 |
| 2,219,555 | Burwell | Oct. 29, 1940 |
| 2,248,742 | Burnham | July 8, 1941 |
| 2,576,197 | Stephens | Nov. 27, 1951 |
| 2,604,647 | Stephens | July 29, 1952 |
| 2,622,255 | Ver Nooy | Dec. 23, 1952 |

FOREIGN PATENTS

| | | |
|---|---|---|
| 11,667 | Great Britain | of 1847 |